W. E. WARD.

Screw-Cutting Dies.

No. 134,777.  Patented Jan. 14, 1873.

WITNESSES:-
A. J. de Lacy
G. W. Browne

INVENTOR.
W. E. Ward

UNITED STATES PATENT OFFICE.

WILLIAM E. WARD, OF PORT CHESTER, NEW YORK.

IMPROVEMENT IN SCREW-CUTTING DIES.

Specification forming part of Letters Patent No. 134,777, dated January 14, 1873.

*To all whom it may concern:*

Be it known that I, WILLIAM E. WARD, of Port Chester, Westchester county, in the State of New York, have invented new and useful Improvements in Dies and Chucks for Cutting Screw-Threads on Bolts and other Cylindrical Bodies; and I do hereby declare the following to be a full, clear, and exact description thereof, reference being had to the accompanying drawing making part of this specification, in which—

Figure 1:
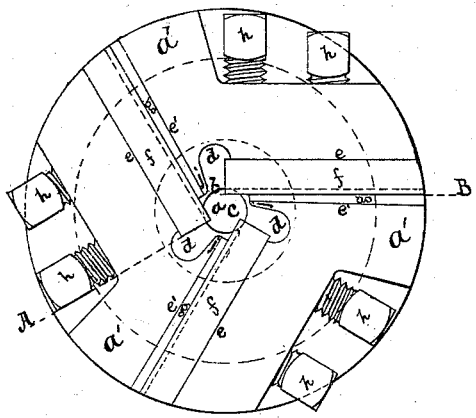
Figure 2:
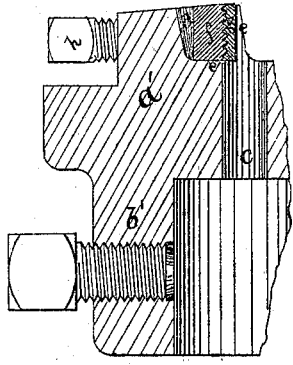
Figure 3:
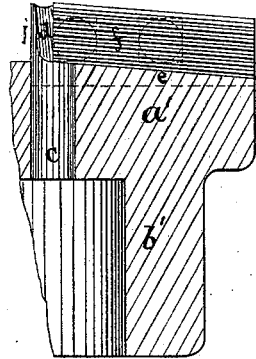

Figure 1 is a face view of the chuck and dies. Figs. 2 and 3 are longitudinal sections taken in the planes of the lines A $a$ and B $b$ of Fig. 1.

The same letters indicate like parts in the several figures of the drawing.

In the accompanying drawing, $a'$ represents the chuck, in which the dies are secured, and which is suitably formed, as at $b'$, to be fitted and secured to the mandrel of a lathe. It is formed with a central hole, $c$, of the size of the largest screw intended to be cut; and with three gullets or enlargements, $d\ d\ d$, for the free discharge of the cuttings; and from these gullets extend three grooves or channels, $e\ e\ e$, with sides which slightly converge toward the center for the reception of the cutting-dies $f\ f\ f$, which have parallel sides and adjusting-plates $g\ g\ g$, which are slightly wedge-shaped; so that by pushing them in or out the tangent planes of the grooved faces of the dies can be adjusted relatively to the size of screws to be cut. The inner faces $e'\ e'\ e'$ of the channels $e\ e\ e$ are tangent to a central circle a little less than the diameter of the smallest screw intended to be cut, as the object is to have the grooved face of the cutting-dies tangent to the diameter of the screw to be cut, or nearly so. That face of each of the cutting-dies $f\ f\ f$ which is in contact with the adjusting-plates $g\ g\ g$ is grooved longitudinally, so that the cross-section will represent the threads of the screw to be cut. From that edge of the dies which is flush with the outer face of the chuck the grooves in the said dies must be cut so that they will correspond in the circle with the pitch of the intended screw. One face of the adjusting-plate $g$ $g\ g$ is grooved in like manner to fit the grooves of the dies. As the inner ends of the dies do the cutting, all that is necessary for sharpening is to grind off from the inner end, which is about at right angles with the grooved face. The dies and adjusting-plates are secured in their channels by temper-screws $h\ h$, two for each die, and the inner ones of said screws should be opposite to the cutting part of the dies to prevent springing.

For setting the dies and adjusting the plates in the chuck I prefer to employ a gage-screw, $i$, of the size of the screw desired to be cut. If the screws desired to be cut are of the diameter of the central hole $c$ the gage-screw $i$ will be guided centrally in the chuck by the three points $j\ j\ j$ of the gullets; but if the screws to be cut are of less diameter, then the latter must be held centrally in the central hole of the chuck by any suitable means. The adjusting-plates are then inserted until their inner ends touch the threads of the gage-screw $i$, and then the dies are inserted and pushed until their inner ends fit the thread of the gage-screw, and the faces of the three shall be in or nearly in planes tangent to the periphery of the gage-screw, and when so adjusted the temper-screws are turned up hard to hold the dies and adjusting-plates in place. The gage-screw is then removed, and the apparatus is ready to cut screws of the size of the screw used as a gage.

The adjusting-plates represented in the accompanying drawing are of a thickness suited to the cutting of screws of a diameter equal to the size of the central hole $c$ in the chuck; and for screws of that size it is not necessary that the inner ends should be brought into contact with the gage-screw, because the three projecting parts $j\ j\ j$ of the gullets act as rests to the screw during the cutting operation; but for screws of less diameter the inner ends of the adjusting-plates are to be set to act as rests.

The chuck should be provided with adjusting-screws of different diameters, and with several sets of adjusting-plates of different thicknesses to suit, so that for each diameter of screw to be cut the grooved faces of the dies may be set on tangents to such diameter.

From the foregoing it will be seen that the dies are straight pieces of steel with parallel sides and one of the long faces grooved, so that for sharpening it is only necessary to grind off the inner end; that by the use of adjusting-plates and the mode of securing the cutters in the chuck the grooved faces of the dies can be readily adjusted to screws of any desired size; and by the use of the gage-screw the several parts can be readily adjusted with reference to the axis of the chuck.

What I claim as my invention, and desire to secure by Letters Patent, is—

The chuck, with its central hole and gullets and tangent-channels, in combination with the dies and adjusting-plates, grooved and secured substantially as and for the purpose described.

W. E. WARD.

Witnesses:
  A. J. DE LACY,
  LOUIS SEAMAN.